July 26, 1960 — T. J. SULLIVAN — 2,946,341
UNIDIRECTIONAL CHECK VALVE
Filed Feb. 21, 1957
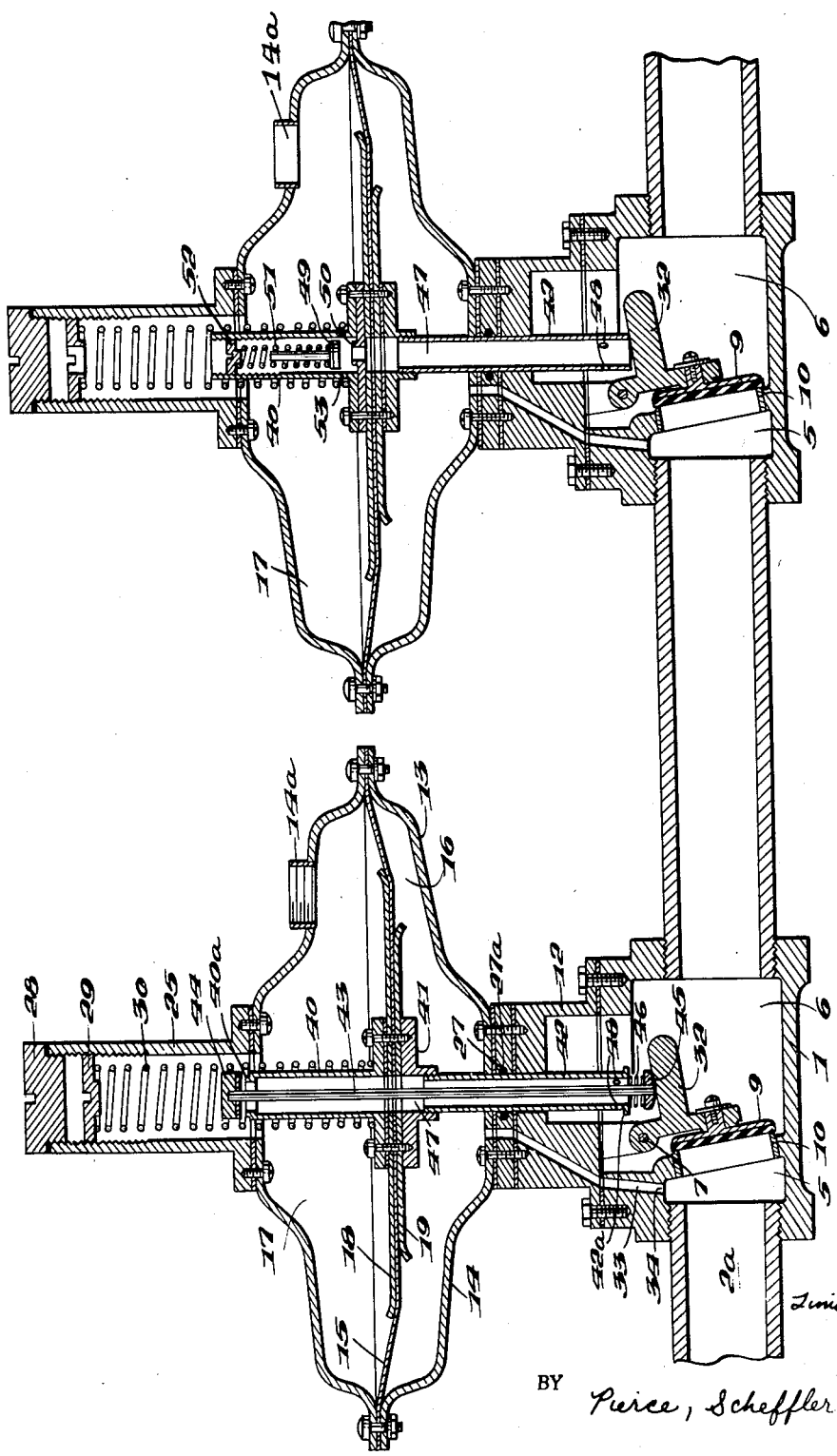
INVENTOR
Timothy J. Sullivan
BY Pierce, Scheffler & Parker
ATTORNEYS United States Patent Office 2,946,341
Patented July 26, 1960

2,946,341

UNIDIRECTIONAL CHECK VALVE

Timothy J. Sullivan, Butte, Mont., assignor to Sullivan Valve and Engineering Company, Butte, Mont., a corporation of Montana Filed Feb. 21, 1957, Ser. No. 641,648

3 Claims. (Cl. 137—116.5)

This invention relates generally to check valves, and more particularly to unidirectional check valves which cannot be opened until the supply pressure reaches a desired predetermined quantity and which will positively prevent fluid-flow in the reverse direction through the valve upon decrease of the supply from the predetermined quantity.

The problems which are created by the occurrence of backflow pressures in water systems supplying multi-story buildings, ships, large commercial plants and the like are well known in the hydraulic engineering field. Backflow pressure surges are caused in water supply lines in many ways, as for example by the syphonage effect which might result from a break in the main water line or a decrease in water pressure due to fire hydrant use. To prevent injury to equipment, disruption of service, and undesirable syphonage effects, my invention was developed.

The object of my invention is to provide a check valve which will open only when the supply pressure is above a desired predetermined quantity and which will immediately close upon the occurrence of a backflow pressure surge.

Another object of my invention is to provide a unidirectional check flow valve provided with pressure motor means responsive to the valve inlet pressure so that the valve member cannot open unless the inlet pressure is above a predetermined desired quantity.

A further object of my invention is to provide a dual control valve arrangement having a plurality of unidirectional serially-arranged valves controlled in accordance with the pressure of the inlet chamber of the first valve and being independently operable upon the presence of backflow pressure surges.

Still another object of my invention is to provide a unidirectional check valve which will prevent pressure buildup against the upstream valve seat by means of a pressure releasing device which is operable in the event of backflow pressure surge.

Other objects and advantages of my invention will become more apparent from a study of the following specification when considered in conjunction with the accompanying drawing, in which the single figure is a vertical longitudinal view partly in section showing a series arrangement of two other embodiments of my invention.

Referring now to the drawing, two embodiments of backflow valves according to my invention have been illustrated in series arrangement in the fluid supply line.

Assuming for the moment that only the left-hand valve is connected in the supply line, complete protection would be given to the system against back-flow surges, syphoning effects, and vapor pressure buildups as will be described below.

As is apparent in the drawing, the diaphragm assembly which is secured to diaphragm 15 by means of upper and lower diaphragm plates 18 and 19 respectively consists of an upper tubular member 40 and a lower member 41 to which is threadably secured hollow sleeve 42. Sleeve 42 is slidably movable within opening 27 in bonnet 12 in accordance with the position of diaphragm 15 within the housing 14. Extending longitudinally through hollow member 42, diaphragm 15, and hollow member 40 is valve rod 43 having a valve member 44 secured to the upper end thereof. Secured to the lower end of valve rod 43 is a contact member 45 adapted to cooperate with projection 32 on the main valve arm 9. Spring 46 is secured under tension between contact member 45 and flange 42a of the hollow stem 42 and tends to urge valve rod 43 downwardly with respect to hollow members 40, 42 with the result that valve 44 is caused to be seated upon seat 40a to close the upper end of the vertical passage 47. Apertures 48 in the lower portion of hollow sleeve 42 provide means of communication between passage 47 and the outlet chamber 6 of the main valve body.

The operation of the valve for backflow conditions may now be readily described:

Upon decrease of supply pressure in inlet chamber 5, the pressure of lower diaphragm chamber 16 will decrease correspondingly and spring 30 will urge diaphragm 15 and the valve assembly secured thereto downwardly. Hollow sleeve 42 slides downwardly through opening 27 in the bonnet 12 and contact member 45 engages projection 32 to cause main valve member 9 to pivotally close upon seat 10. When valve member 9 is closed upon seat 10, further downward movement of sleeve 42 resulting from the expansion of spring 30 will cause spring 46 to be compressed and valve rod 43 to be moved upwardly with respect to hollow sleeve 42. Valve member 44 will thus be lifted from seat 40a to open passage 47. Hence, should backflow fluid be introduced in discharge chamber 6 of the valve due to possible syphonage in the water supply lines, the fluid would enter apertures 48 of hollow sleeve 42 and would rise upwardly through passage 47 and be discharged from seat 40a into upper diaphragm chamber 17. The weight of the fluid in chamber 17 will further urge diaphragm 15 and hollow sleeve 42 connected thereto downwardly to forceably position valve member 9 against seat 10 and to maintain valve member 44 in a lifted position from its seat 40a. The excess backflow fluid will be discharged from the diaphragm housing through discharge outlet 14a. Upon building up of supply pressure in inlet chamber 5, diaphragm 15 will be raised to lift rod 43 and allow main valve member 9 to pivotally open.

In the right-hand valve of the drawing, another arrangement for the discharge of backflow fluid is shown. In this embodiment the valve rod arrangement 43 is replaced by a vertically movable valve member 49 which by means of expansion spring 51 is urged downwardly upon valve seat 50 transversely secured in passage 47. The tension of expansion spring 51 may be adjusted as desired by vertical threaded movement of nut 52 within hollow member 40. Apertures 53 are provided in the lower portion of hollow member 40 and provide means of communication between passage 47 and upper diaphragm chamber 17. As will be apparent from the figure, when the valve 9 is seated upon seat 10 due to a reduction of supply pressure in chamber 5 of the main valve, hollow sleeve 42 will be urged downwardly into contact with projection 32 by spring 30. Upon the occurrence of backflow fluid in chamber 6, the fluid will be admitted through apertures 48 into passage 47. As the backflow pressure builds up, valve member 49 will be lifted upwardly to compress spring 51 and to open passage 47 to upper diaphragm chamber 17 through apertures 53. The backflow fluid will then be discharged through discharge 14a. This valve arrangement is particularly applicable for installations where the backflow fluid is in vapor form, such as steam produced in downstream applications by direct-fired boilers, hot water tanks or the like. The valve 49 in these instances would function as a pressure relief valve for the backflow fluids.

The combination of the valves shown in the drawing constitutes an excellent backflow-preventative, anti-syphon valve. The protection provided by the two check valves connected in series is considerably greater than that presented by an ordinary check valve. Leakage through either valve will be readily compensated for by the other valve. Practically no resistance to fluid supply is offered due to the free flow construction of the body on tht service side of the valve, but in the event of a break in the water delivery line or a pressure drop in the supply line below a predetermined value which might result in a backflow from the building into the line, positive closure of the valve upon reversal of the fluid is instantaneously assured. Also the right hand unit provides a pressure relief valve that will protect the system against any undesirable rise in backflow vapor pressures which might be produced by vessels connected on the outlet side of the valves.

Of course it is apparent that the valves illustrated in the drawing may be easily combined in a twin casting to present a compact, rugged, quick-response valve.

While in accordance with the provisions of the statutes I have illustrated and described the best form of my invention known to me, it will be apparent to those skilled in the art that changes may be made in the form of the apparatus described without departing from the spirit of my invention as set forth in the appended claims:

I claim:

1. A uni-directional backflow check valve for a fluid supply line comprising in combination a valve housing having an inlet and an outlet, the interior of said housing being divided into an inlet chamber and an outlet chamber by a transverse wall having a valve seat therein; a main valve member, means for mounting said main valve member within said outlet chamber whereby said valve member is seated upon the valve seat to close the valve passage, said main valve member being freely removable from said valve seat by fluid flow from the inlet chamber to the outlet chamber but being closed upon the valve seat by fluid flow in the reverse direction; pressure motor means for retaining said main valve member upon its seat when the fluid pressure in said inlet chamber drops below a predetermined quantity comprising a pressure motor housing secured to said valve housing, a flexible diaphragm dividing said pressure motor housing into a lower pressure chamber and an upper pressure chamber, a hollow valve closure stem rigidly connected to and extending through said diaphragm, the lower end of said valve stem extending through an opening in the valve housing and terminating adjacent the valve member, said hollow stem providing communication between the valve outlet chamber and the pressure motor upper chamber, and spring means urging said diaphragm in a direction to cause said hollow valve closure stem to close the main valve member upon its seat; conduit means providing communication between said pressure motor lower pressure chamber and said valve inlet chamber to lift said diaphragm for raising said hollow stem from said main valve member when the pressure in said inlet chamber exceeds a predetermined value; said pressure motor housing having a backflow fluid venting opening in the wall of the upper pressure chamber and said hollow stem having means for providing continuous communication between the interior thereof and the valve outlet chamber for all positions of said stem; and pressure release valve means cooperating with said hollow stem for controlling the venting passage of backflow fluid passing therethrough from the valve outlet chamber to the pressure motor upper chamber venting opening.

2. A check valve as defined in claim 1 wherein said pressure release valve means comprises a release valve member adapted to be seated upon the upper end of said hollow valve closure stem to close the passage therethrough, a rod connected at its upper end to said release valve member and extending through said stem and projecting from the lower end thereof adjacent the valve member, spring means biasing said rod downwardly to cause said release valve to be seated upon its seat, whereby when said diaphragm is urged downwardly upon reduction of pressure in the valve inlet chamber beyond a predetermined value, the lower extremity of said rod will contact said main valve member to open said release valve.

3. A check valve as defined in claim 1 wherein said pressure release valve means comprises a pressure release valve seat transversely arranged within said hollow valve closure stem, a release valve member in said hollow stem, and spring means in said hollow stem normally biasing said release valve member upon its seat to close the passage through said hollow stem, whereby when the backflow pressure of the fluid in the outlet chamber of the valve exceeds a predetermined value said pressure release valve will be opened.

References Cited in the file of this patent

UNITED STATES PATENTS

| | | |
|---|---|---|
| 700,954 | Lombard | May 27, 1902 |
| 2,026,704 | Petroe | June 7, 1936 |
| 2,357,133 | Rider | Aug. 29, 1944 |
| 2,398,461 | Rider | Apr. 16, 1946 |
| 2,504,006 | Davis | Apr. 11, 1950 |

FOREIGN PATENTS

| | | |
|---|---|---|
| 553,442 | Germany | June 25, 1932 |
| 148,230 | Australia | Sept. 16, 1952 |